(12) United States Patent  
de la Iglesia et al.

(10) Patent No.: US 9,069,676 B2  
(45) Date of Patent: Jun. 30, 2015

(54) MAPPING ENGINE FOR A STORAGE DEVICE

(71) Applicants: Erik de la Iglesia, Mountain View, CA (US); Som Sikdar, Mountain View, CA (US); David Parker, Mountain View, CA (US); Sivaram Dommeti, Mountain View, CA (US)

(72) Inventors: Erik de la Iglesia, Mountain View, CA (US); Som Sikdar, Mountain View, CA (US); David Parker, Mountain View, CA (US); Sivaram Dommeti, Mountain View, CA (US)

(73) Assignee: VIOLIN MEMORY, INC., Santa Clara, CA (US)

( * ) Notice: Subject to any disclaimer, the term of this patent is extended or adjusted under 35 U.S.C. 154(b) by 221 days.

(21) Appl. No.: 13/764,975

(22) Filed: Feb. 12, 2013

(65) Prior Publication Data

US 2014/0229653 A1    Aug. 14, 2014

Related U.S. Application Data

(63) Continuation of application No. 12/790,255, filed on May 28, 2010, now Pat. No. 8,402,198.

(60) Provisional application No. 61/183,912, filed on Jun. 3, 2009.

(51) Int. Cl.  
*G06F 12/08*    (2006.01)

(52) U.S. Cl.  
CPC ........ *G06F 12/0866* (2013.01); *G06F 12/0871* (2013.01)

(58) Field of Classification Search  
CPC .. G06F 12/0866; G06F 12/0871; G06F 12/08

USPC ......... 711/118, 3, 4, 103, 112, 114, 154, 156, 711/205, 206, 207; 365/185.33

See application file for complete search history.

(56) References Cited

U.S. PATENT DOCUMENTS

| | | |
|---|---|---|
| 5,954,796 A | 9/1999 | McCarthy |
| 6,041,366 A | 3/2000 | Maddalozzo et al. |
| 6,401,147 B1 | 6/2002 | Sang et al. |
| 6,636,982 B1 | 10/2003 | Rowlands |
| 6,678,795 B1 | 1/2004 | Moreno et al. |
| 6,721,870 B1 | 4/2004 | Yochai et al. |
| 6,742,084 B1 | 5/2004 | Defouw et al. |
| 6,789,171 B2 | 9/2004 | Desai et al. |
| 6,810,470 B1 | 10/2004 | Wiseman et al. |
| 6,986,015 B2 * | 1/2006 | Testardi ................ 711/202 |
| 7,013,379 B1 * | 3/2006 | Testardi ................ 711/206 |
| 7,017,084 B2 | 3/2006 | Ng et al. |
| 7,089,370 B2 | 8/2006 | Luick |
| 7,110,359 B1 | 9/2006 | Acharya |
| 7,173,929 B1 * | 2/2007 | Testardi ................ 370/355 |
| 7,280,536 B2 * | 10/2007 | Testardi ................ 370/355 |
| 7,392,344 B2 * | 6/2008 | Pribbernow et al. ...... 711/118 |
| 7,640,396 B2 * | 12/2009 | Pribbernow et al. ...... 711/118 |
| 7,711,923 B2 * | 5/2010 | Rogers et al. ............. 711/206 |
| 7,856,533 B2 | 12/2010 | Hur et al. |
| 7,870,351 B2 | 1/2011 | Resnick |
| 7,873,619 B1 | 1/2011 | Faibish et al. |

(Continued)

*Primary Examiner* — Stephen Elmore  
(74) *Attorney, Agent, or Firm* — Brinks Gilson & Lione (57) ABSTRACT

A hardware search structure determines the status of cache lines associated with a large disk array and at the same time reduces the amount of memory space needed for tracking the status. The search structure is configurable in hardware to different cache line sizes and different primary and secondary index sizes. A maintenance feature invalidates state record entries based both on their time stamps and on associated usage statistics.

19 Claims, 11 Drawing Sheets

(56) References Cited

U.S. PATENT DOCUMENTS

| | | |
|---|---|---|
| 7,975,108 B1 | 7/2011 | Holscher et al. |
| 8,010,485 B1 | 8/2011 | Chatterjee et al. |
| 8,402,198 B1 * | 3/2013 | de la Iglesia et al. ............ 711/3 |
| 8,402,246 B1 * | 3/2013 | de la Iglesia .................. 711/201 |
| 8,442,059 B1 * | 5/2013 | de la Iglesia et al. ......... 370/400 |
| 8,443,150 B1 * | 5/2013 | de la Iglesia ................. 711/135 |
| 2002/0035655 A1 | 3/2002 | Finn et al. |
| 2002/0175998 A1 | 11/2002 | Hoang |
| 2002/0194434 A1 | 12/2002 | Kurasugi |
| 2003/0012204 A1 | 1/2003 | Czeiger et al. |
| 2003/0167327 A1 | 9/2003 | Baldwin et al. |
| 2003/0177168 A1 | 9/2003 | Heitman et al. |
| 2003/0210248 A1 | 11/2003 | Wyatt |
| 2004/0128363 A1 | 7/2004 | Yamagami et al. |
| 2004/0146046 A1 | 7/2004 | Jo et al. |
| 2004/0186945 A1 | 9/2004 | Jeter et al. |
| 2004/0215923 A1 | 10/2004 | Royer |
| 2005/0025075 A1 | 2/2005 | Dutt et al. |
| 2005/0195736 A1 | 9/2005 | Matsuda |
| 2006/0005074 A1 | 1/2006 | Yanai et al. |
| 2006/0034302 A1 | 2/2006 | Peterson |
| 2006/0053263 A1 | 3/2006 | Prahlad et al. |
| 2006/0075191 A1 | 4/2006 | Lolayekar et al. |
| 2006/0112232 A1 | 5/2006 | Zohar et al. |
| 2006/0212524 A1 | 9/2006 | Wu et al. |
| 2006/0218389 A1 | 9/2006 | Li et al. |
| 2006/0277329 A1 | 12/2006 | Paulson et al. |
| 2007/0050548 A1 | 3/2007 | Bali et al. |
| 2007/0079105 A1 | 4/2007 | Thompson |
| 2007/0118710 A1 | 5/2007 | Yamakawa et al. |
| 2007/0124407 A1 | 5/2007 | Weber et al. |
| 2007/0192444 A1 | 8/2007 | Ackaouy et al. |
| 2007/0233700 A1 | 10/2007 | Tomonaga |
| 2007/0283086 A1 | 12/2007 | Bates |
| 2008/0028162 A1 | 1/2008 | Thompson |
| 2008/0098173 A1 | 4/2008 | Chidambaran et al. |
| 2008/0104363 A1 | 5/2008 | Raj et al. |
| 2008/0162864 A1 | 7/2008 | Sugumar et al. |
| 2008/0215827 A1 | 9/2008 | Pepper |
| 2008/0215834 A1 | 9/2008 | Dumitru et al. |
| 2008/0250195 A1 | 10/2008 | Chow et al. |
| 2008/0320269 A1 | 12/2008 | Houlihan et al. |
| 2009/0006725 A1 | 1/2009 | Ito et al. |
| 2009/0006745 A1 | 1/2009 | Cavallo et al. |
| 2009/0034377 A1 | 2/2009 | English et al. |
| 2009/0110000 A1 | 4/2009 | Brorup |
| 2009/0240873 A1 | 9/2009 | Yu et al. |
| 2009/0259800 A1 | 10/2009 | Kilzer et al. |
| 2009/0262741 A1 | 10/2009 | Jungck et al. |
| 2009/0276588 A1 | 11/2009 | Murase |
| 2009/0307388 A1 | 12/2009 | Tchapda |
| 2010/0011154 A1 | 1/2010 | Yeh |
| 2010/0030809 A1 | 2/2010 | Nath |
| 2010/0080237 A1 | 4/2010 | Dai et al. |
| 2010/0088469 A1 | 4/2010 | Motonaga et al. |
| 2010/0115206 A1 | 5/2010 | de la Iglesia et al. |
| 2010/0115211 A1 | 5/2010 | de la Iglesia et al. |
| 2010/0122020 A1 | 5/2010 | Sikdar et al. |
| 2010/0125857 A1 | 5/2010 | Dommeti et al. |
| 2010/0169544 A1 | 7/2010 | Eom et al. |
| 2010/0174939 A1 | 7/2010 | Vexler |
| 2011/0047347 A1 | 2/2011 | Li et al. |
| 2011/0258362 A1 | 10/2011 | McLaren et al. |
| 2012/0198176 A1 | 8/2012 | Hooker et al. |

* cited by examiner

MAPPING ENGINE FOR A STORAGE DEVICE

This application is a continuation application of U.S. Ser. No. 12/790,255, filed on May 28, 2010 which claims priority to provisional application U.S. 61/183,912 filed on Jun. 3, 2009, each of which is incorporated by reference in its entirety.

BACKGROUND

A storage system is coupled between a plurality of storage targets, such as disks, and a plurality of initiators, such as computer servers. The storage system improves memory access performance, failure recovery, and simplifies storage management.

Performance improvements are achieved through caching, replication, tiering that uses the highest-performance target disks for the most commonly used data, or other means. The storage system may translate virtual disk operations to physical accesses of selected target disks, cache memory, or internal storage.

Mapping in the storage system may be coarse, where only individual disks or large portions of a disk are mapped, or fine, where small portions of a disk or even groups of blocks are mapped to a virtual address space. For caching implementations, it may be desired to have a specific and therefore small fine mapping to sizes of the cache lines. Typical line sizes for a storage cache are 4 KB (thousand bytes) and 64 KB but many values are possible. Each cache line, the smallest granularity of cached data, maintains state information regarding the corresponding cached data referred to as a tag. Cache performance is typically a function of the tag lookup speed where the storage system determines if a given cache line is present within the cache and in a valid state.

Cache performance is also a function of the cache size, which includes the total memory size and resources consumed by the tags, and the supporting search structure.

DETAILED DESCRIPTION

A hardware-based mapping engine maps any location in a target disk array to a unique storage cache. The search structure used in the mapping engine allows any location in the disk array to be mapped to a cache resource while still providing fast cache lookups and using only a limited amount of memory. The search structure automatically invalidates cache entries based on both the amount of time the cache entries are stored in the cache resource and on access statistics of the cache entries.

Figure 1:
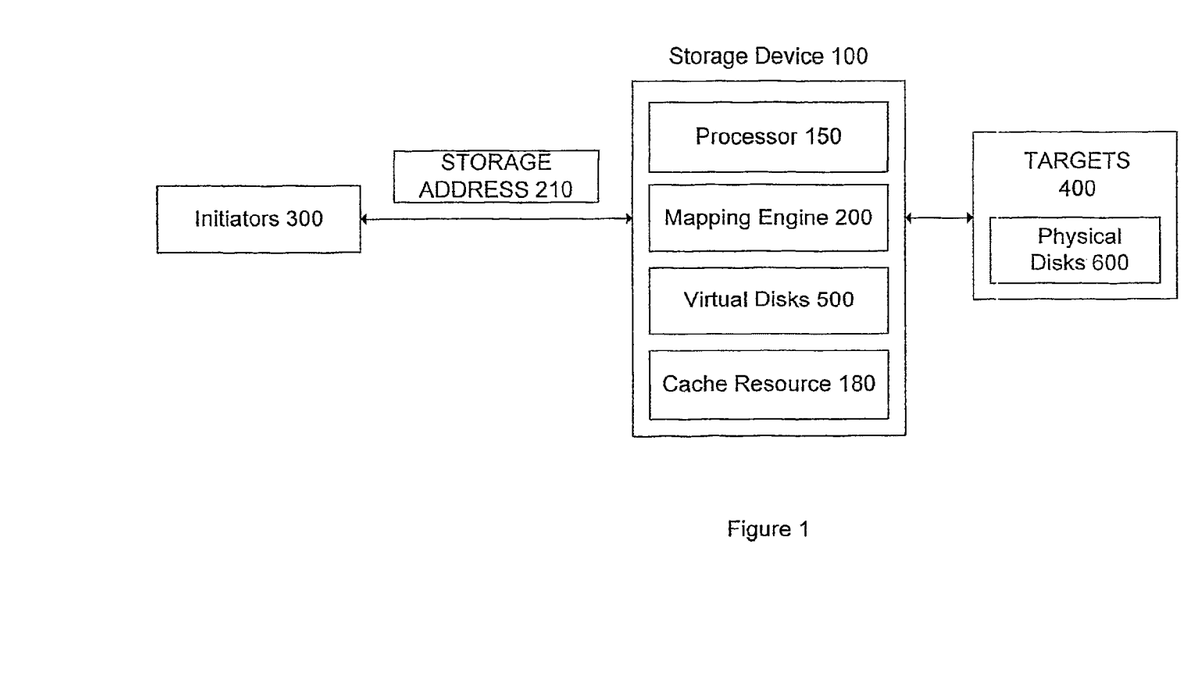
FIG. 1 is a block diagram of a storage device that uses a novel mapping scheme.

FIG. 1 shows the connectivity between initiators 300 and targets 400 through a mapping engine 200 within a storage device 100. The initiators 300 can be servers, server applications, routers, switches, client computers, or any other device or software that needs to, assess data. The targets 400 can be any device that stores data accessed by another device or application. For example, the targets 400 can be storage devices or storage servers that contain storage devices and/or storage disk arrays.

The storage device 100 resides between the initiators 300 and the targets 400 and can comprise hardware and/or software located in a storage appliance. For example, the storage device 100 may reside within a wireless or wired router, gateway, firewall, switch, or any other computer processing system. The initiators 300, storage device 100, and targets 400 can be directly connected, or connected to each other through a network or fabric. The storage device 100 accepts reads and writes to targets 400 from initiators 300 and provides an abstraction of physical disks 600 in target 400 as virtual disks 500. The storage device 100 also provides a caching resource 180 for the physical disks 600 in targets 400.

The initiators 300 provide a storage address 210 for accessing data in the physical disks 600 in targets 400. The storage device 100 uses the storage address 210 as a virtual address to reference the virtual disks 500 in the storage device 100. The storage device 100 then maps the virtual disks 500 to corresponding physical disks 600 within the targets 400.

In one embodiment, the mapping engine 200 is a hardware device, such as a Peripheral Component Interconnect (PCI) card composed of logic and memory elements or any arbitrary Host Bus Adapter (HBA) technology. In this embodiment, the cache resource 180 and other memory may be entirely within the hardware device operating as mapping engine 200. In another embodiment, memory in mapping engine 200 is shared with the processor system 150 used in the storage device 100 in which the PCI or HBA card operating as mapping engine 200 is placed. In another embodiment, mapping engine 200 consists of a hardware device which accelerates functions performed by the storage device 100. In another embodiment, the mapping engine 200 is implemented in software that operates on the processing system 150 used in storage device 100.

Figure 2:
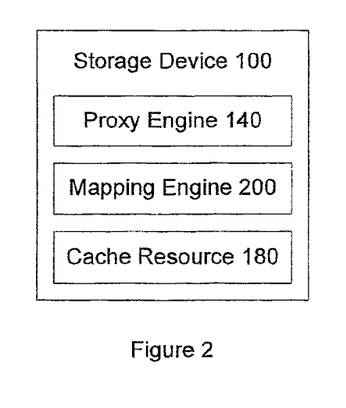
FIG. 2 shows the storage device of FIG. 1 in more detail.

FIG. 2 shows different functional elements in the storage device 100 in more detail. The storage device 100 includes a proxy engine 140, mapping engine 200, and cache resource 180. Proxy engine 140 manages the communication protocol between initiators 300 and targets 400. Typical protocols include Fiber Channel Protocol (FCP), Small Computer System Interface (SCSI), Advanced Technology Attachment (ATA), and encapsulated protocols such as Fiber Channel Over Ethernet (FCOE), Internet Small Computer System Interface (ISCSI), and Fiber Channel over Internet Protocol (FCIP), ATA over Ethernet (AOE) and others.

The mapping engine 200 uses the proxy engine 140 to abstract the different communication protocols mentioned above into generic reads, writes and other operations for memory block operations. Block operations refer to memory accesses for a contiguous range of data referred to as a block of data or memory block. For example, a memory block may consist of a contiguous 4 KiloByte (KB) block of data.

The cache resource 180 contains the memory or block storage to hold cached data. The cache resource 180 can be any relatively fast memory storage element, such as an array of Integrated Circuit solid state memory, like Flash, Dynamic Random Access Memory (DRAM), or Static Random Access Memory (SRAM). The cache resource 180 could also be a local or remote disk, such as a relatively fast disk in targets 400.

Proxy engine 140 intercepts read or write requests from the initiators 300 and uses mapping engine 200 to determine if a particular read or write is located in the cache resource 180. If the data associated with a read operation from initiators 300 is located in the cache resource 180, the proxy engine 140 uses the cache resource 180 for the memory access operation. If the data is not located in the cache resource 180, the proxy engine 140 accesses the targets 400 for the data associated with the read requests.

A common performance limitation for caching systems is the capacity for concurrent cache lines within the search structure. This limitation can arise from the size limitation of the search structure, the time required to parse or maintain the search structure, the size limitation of state records, the availability of cache resources, or any combination of these factors. For example, a disk array used in targets 400 may have a range of one terabyte and the cache used with the targets may only have a capacity of one gigabyte.

In this situation, the cache would likely not work effectively because there is substantially more memory in the disk array than in the cache. This size discrepancy causes the cache to continuously thrash, forcing the cache to constantly replace the cached data with new data accessed from the disk array. Additionally, the search structure of such a cache must support a one terabyte address space (to map the entire target storage range) which may be a performance limitation.

It is highly desirable to match the storage capacity of the targets 400 with the mapping capabilities of the cache system so that allocated resources are adequately utilized. A search structure architecture described below increases the utilization efficiency and scalability of cache resources. The search structure allows the mapping engine 200 to provide one-to-one tracking and mapping for any location within the entire addressing space of targets 400 with extremely large storage capacities. This one-to-one tracking is reconfigurable based on whatever space is available in the caching resources 180 and on memory access patterns. The one-to-one tacking also allows more accurate monitoring of memory access statistics for more effective utilization of cache resource 180. Traditional search structures are either limited in size due to implementation constraints (such as silicon area or component count) or exhibit exponential performance degradation with growth due to attempts to provide large mapping capabilities using compression or indirection.

Figure 3:
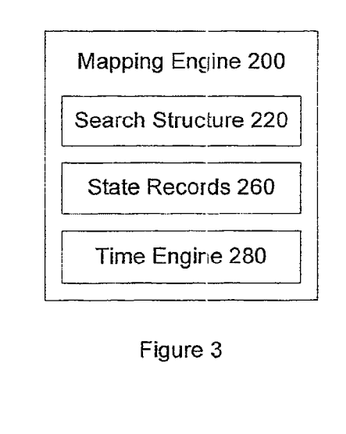
FIG. 3 shows a mapping engine used in the storage device in more detail.

FIG. 3 describes the mapping engine 200 in more detail. The mapping engine 200 includes a search structure 220, state records 260 and a time engine 280. The search structure 220 takes the storage address 210 from the proxy engine 140 and looks for a corresponding address in the cache resource 180. The granularity of search structure 220 refers to the block sizes for the data accessed at the same time by the storage device 100. The block size is also referred to as the line size of the cache resource 180 and can be any configurable size.

The state records 260 determine the state of a cache line in the cache resource 180. For example, the state records 260 identify when the cache lines were last accessed, if the cache line is valid or invalid, and the location of the cache line in the cache resource 180. Each cache line present within search structure 220 contains a state record 260 that maintains state information, statistics, and a pointer identifying where the data in the corresponding cache line is located.

The time engine 280 is used for recovering stale cache lines. Recovering a cache line refers to invalidating data currently loaded into the cache line so that the cache line and any linked cache resource can be used for caching new data. The decision criteria for recovering cache lines may include the time since a last access to the cache line, a directive from the proxy engine 140 to immediately reclaim the cache line, other statistics within the state record 260, and/or other factors. The use of statistics within state record 260 prevents the premature recovery of cache lines that may be highly beneficial to Storage Device 100 but have not been accessed in some time.

Figure 4:
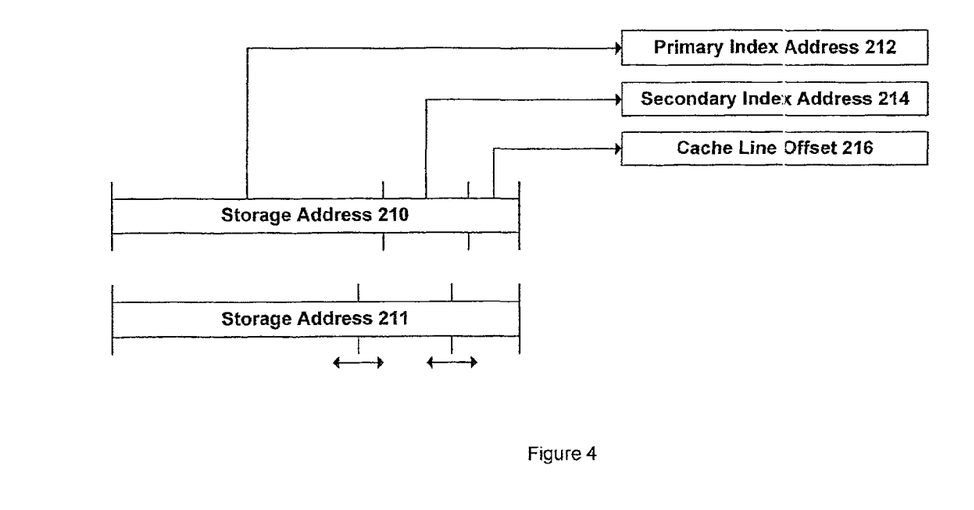
FIG. 4 shows how a search structure in the mapping engine is configurable to different address sizes.

FIG. 4 describes the operation of search structure 220 in more detail. Storage address 210 is the datum used by the search structure 220 to search for a corresponding cache line. The storage address 210 may consist of an arbitrary number of bits that define the width of the datum. For most storage systems, the typical width of a storage address is 48 bits although a significantly lower number of bits may also be used. For example, the SCSI specification uses a 48 bit storage address.

As mentioned above, storage address 210 addresses units of blocks with the block size being a property of the storage medium or disks in targets 400. Typical disks are configured with a block size of 512 bytes. As an example, a 500 GigaByte (GB) disk with 512B blocks will have approximately 1 billion blocks requiring 30 bits of storage address (i.e., 2 to the power 30 equals approximately 1 billion). In this example, only the lower 30 bits of the 48 bit storage address 210 would be needed.

To search for an arbitrary block within search structure 220, storage address 210 is split into three components: primary index address 212, secondary index address 214, and cache line offset 216. The size of these address sections is a function of the cache line size and cache line configuration. One advantage of the search structure 220 is the ability to dynamically adjust the sizes of primary index address 212, secondary index address 214, and cache line offset 216 based on statistics gathered within the state records 260 (FIG. 3). Although not used for the search operation, cache line offset 216 may be used to select a subset of the cache line data for return to Initiators 300 in response to a read operation. In practice, this value is the offset within the cache line at which the requested data starts. The offset range is, by necessity, smaller than the cache line size.

For example, based on the read or write patterns for storage accesses by the initiators 300 in FIG. 1, the search structure 220 may be reconfigured to use more or less bits of the storage address 210 for primary index address 212 and use fewer or more bits for the secondary index address 214 and/or cache line offset 216. This is represented by storage address 211 that uses a different number of bits than storage address 210 for the addresses 212, 214, and 216.

Take for example a read access pattern where each read operation typically accesses a large number of data blocks. In this example, it may be more efficient for the search structure 220 to use a fewer number of bits for the primary index address 212 and more bits for the secondary index address 214. Again, the search structure 220 is easily configurable to different delineations of the three addresses 212, 214, and 216.

Increasing the cache line size, when possible, conserves storage resources in the mapping engine 200 by reducing the number of state record entries 260 (FIG. 3) required to cache a given block of storage. In one embodiment, the cache line size is dynamically adjusted based on algorithms performed within mapping engine 200. In another embodiment, statistics within state records 260 are analyzed by the proxy engine 140 to dynamically adjust the cache line size. It is desirable to configure the cache line size to match the most commonly requested block size in a storage system.

Figure 5:
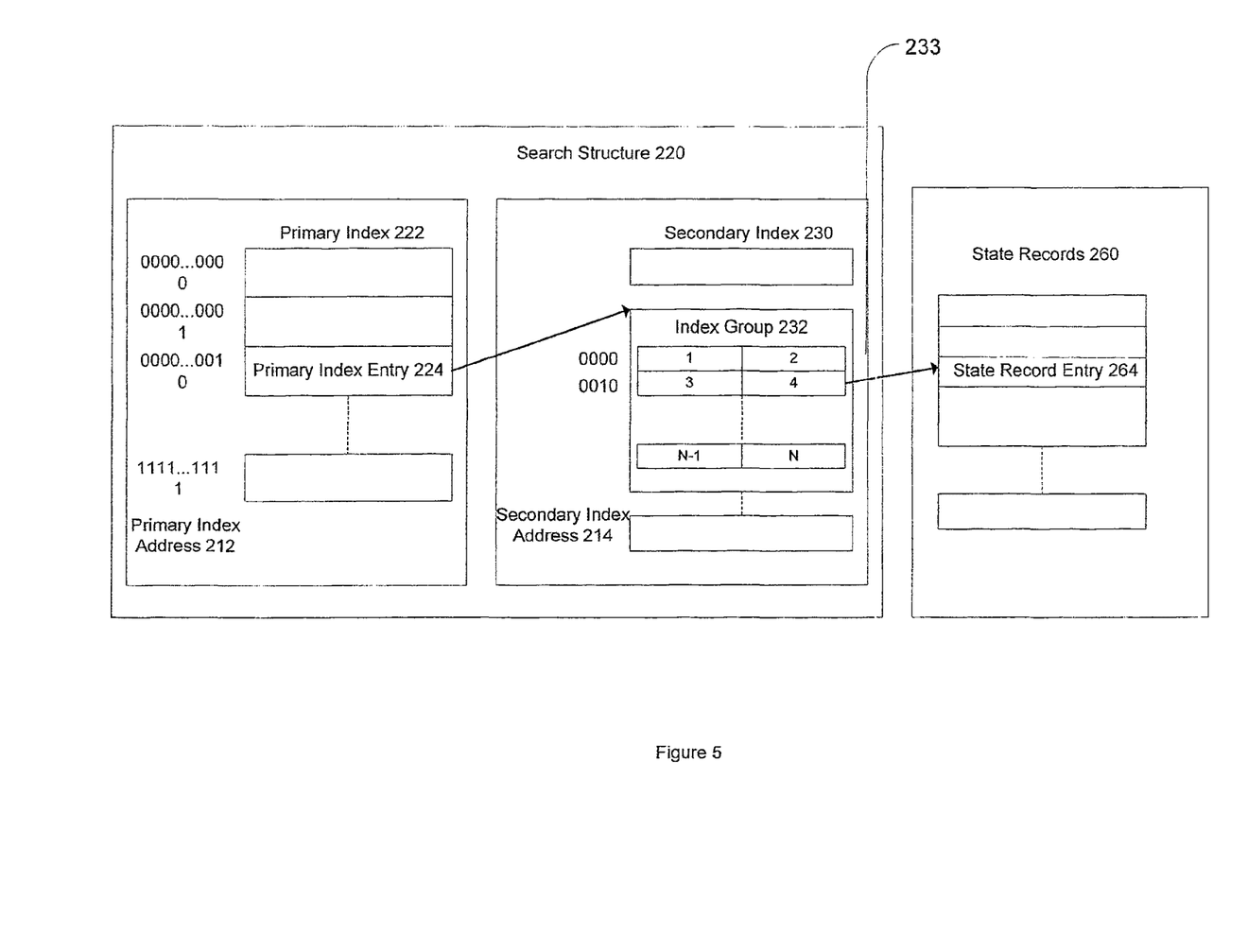
FIG. 5 shows the search structure of the mapping engine in more detail.

Referring to FIGS. 4 and 5, primary index address 212 is used by the search structure 220 as an address into a primary index table 222. In one embodiment, the primary index table 222 is a memory, such as DRAM, that contains an array of pointers 224 into a secondary index table 230. The pointers 224 are alternatively referred to as primary index entries 224.

The primary index entries 224 in primary index 222 cover the entire size of the storage space of the targets 400 in FIG. 1. This is different from conventional cache systems where only a subset of a main memory is referenced via the cache resource. The index lookup in primary index 222 is direct using primary index address 212 as an offset from the base address of primary index 222. Thus, the pointer entries 224 in primary index 222 can be accessed in one clock cycle. The result of the lookup operation is an identification of a pointer (primary index entry 224) that points to an index group 232 in secondary index table 230.

The secondary index table 230 includes index groups 232 that each includes pointers 233 that each separately point to a different state record entry 264 in state records 260. The number of pointers 233 in each index group 232 is derived from the size (number of bits) of secondary index address 214. A single particular pointer 233 in index group 232 is selected using secondary index address 214 as an offset from the base address for index group 232. The selected pointer 233 is then used as an offset from the base address of state records 260 to reference a specific state record entry 264. Each state record entry 264 is associated with a cache line.

A third address section of storage address 210 comprises a cache line offset 216 that identifies a particular portion of the cache line pointed to by the identified entry in index group 232. For example, the cache lines may comprise 4 KB blocks of data and the storage address 210 may reference a particular 512B subblock of data within the 4 KB block. In this example, 12 bits in the storage address 210 would be allocated to the cache line offset 216. Because 12 bits are required to address 4 KB of data (2 to the power of 12 equals 4096), the lowest 12 bits of any storage address will be the offset within a 4 KB cache line. For a cache line size of 64 KB, the offset would comprise 16 bits. If the storage device 100 is configured with larger cache lines, then more bits in storage address 210 would be allocated to the cache line offset 216. The number of bits used in the cache line offset 216 in storage address 210 is also reconfigurable to different cache line sizes within the search structure 220.

The secondary index 230 reduces the amount of memory needed for storing primary index entries 224 in the primary index table 222. For example, the memory space needed for the primary index 222 to store primary index entries 224 is divided by the size of the secondary index 230.

The number of index groups 232 varies according to the number of valid cache lines that are currently being used for caching data for targets 400. It is unlikely that the entire storage space of the targets 400 will be full up at any one time. It is also unlikely that valid cache lines will be needed in cache resource 180 for each primary index entry 224. Thus, the number index groups 232, the number of entries N in the index groups 232, and the number of state records 206 used for referring cache lines do not have to cover every data block referenced by the primary index 222. Thus, fewer bits of the storage address 210 have to be allocated to secondary index address 214 for referencing cache lines.

Without secondary index 230, the search structure 220 would need enough memory to store a primary index entry 224 for each data block within targets 400. The primary index 222 in combination with the secondary index 230 allows the search structure 220 to map cache lines to any data block within targets 400 while at the same time prevents the search structure 220 from having to allocate memory space for each data block within targets 400.

The search structure 220 maps targets 400 with very large memory space. The primary index 222 and secondary index 230 can be scaled down linearly as the cache line size is increased. For example, the primary index 222 may have sufficient memory space to map a multi-terabyte target 400. However, the search structure 220 may be running out of state records 260 and corresponding index groups 232 in secondary index 230. This may be due to sparsely filled index groups 232 that only use a few 512B storage locations for many different larger 4 KB blocks of data. In this case, a larger number of index groups 232 would be required for referencing by the primary index entries 224.

To resolve the space shortage in search structure 220, any number of reconfigurations can be used in the search structure 220. In one example, the number of entries allocated to each index group 232 can be reduced, say in half. Alternatively, or in addition, the number of primary index entries 224 in primary index 222 can be reduced. This would increase the amount of storage in targets 400 associated with each primary index entry 224. Alternatively, or in addition, the size of the cache lines corresponding to each state record 264 can be increased.

The search structure 220 can be reconfigured to the memory access patterns associated with targets 400 to more efficiently utilize the cache resource 180. For example, the number of primary index entries 224 (amount of storage space in targets 400 tracked by each primary index entry 224), the number of pointers 233 used in the index groups 232 (number of state records 264 tracked for each primary index entry 224), and/or cache line size (size of the blocks of data associated with the state records 264) can then be changed to more efficiently map memory accesses to cache resource 180.

The entire search structure 220 can be implemented in a single memory array or separate memory devices where the first address offset into the memory array is associated with the beginning of the primary index 222, a second address offset is associated with the beginning of the secondary index 230, and a third address offset is associated with the beginning of the state records 260.

Figure 6:
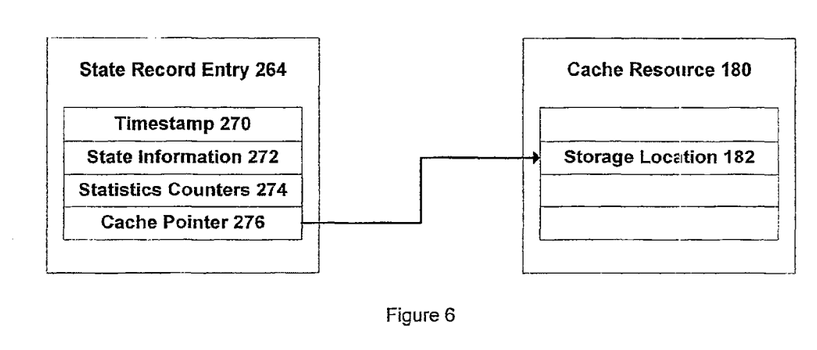
FIG. 6 shows a state record entry and a cache resource of the storage device of FIG. 1 in more detail.

Referring to FIG. 6, the state record entry 264 contains information about the cache line corresponding to storage address 210. This information includes a timestamp 270, state information 272, statistics counters 274, and cache pointer 276. Timestamp 270 maintains the last time that the particular cache line was accessed by any storage read or write operation. State information 272 includes control information such as valid flags, cache quality of service flags, media type flags, local or remote cache flags, etc.

Statistics counters 274 identify the number of read and write operations and other information of relevance about a particular cache line. For example, the statistics counters 274 may track the number and size of read and write operations to a particular cache line. The statistics counters 274 can also be used to identify the overall size of read or write operations that touch multiple cache lines and possibly determine when a particular cache line, and other adjacent cache lines, should time out. When the associated cache line is valid, cache pointer 276 points to a particular storage location 182 in the cache resource 180 containing cached blocks of data.

Search Operation

In the process of performing a search with search structure 220, an empty (or zero valued) pointer is interpreted as a miss indicating the cache line is not present. It is possible to retrieve a valid primary index entry 224 but subsequently miss when retrieving a referenced index group 232.

For example, referring to FIGS. 4-6 the proxy engine 140 may request the mapping engine 200 to conduct a search for a particular storage address 210. The mapping engine 200 first searches primary index 222 using the primary index address 212 of storage address 210. If the search of primary index table 222 comes back null, the mapping engine 200 returns a miss to the proxy engine 140. A hit in primary index 222 will point to an index group 232 in secondary index 230.

The secondary index address bits 214 are used to determine which pointer 233 to use within the referenced index group 232. For example, the primary index address 212 may hit primary index entry 224 that then points to index group 232. The secondary index address 214 address as pointer entry 4 in index group 232. When entry 4 in index group 232 is null, the mapping engine 200 reports a miss back to the proxy engine 140. When valid, the entry 4 is used as a pointer to a state record entry 264 within state records 260. The cache line offset 216 is then used to identify the particular 512K block within the identified cache line that corresponds to state record entry 264.

The validity of state record entry 264 is verified by checking the state information 272 along with the cache pointer 276. When the state record is invalid, the mapping engine 200 reports a miss back to the mapping engine 200. When the state record entry 264 is valid and the cache pointer 276 is not null, the mapping engine 200 returns a hit back to the proxy engine 140. The proxy engine 140 then uses the cache pointer 276 as the Direct Memory Access (DMA) address for supplying the cached data at storage location 182 in cache resource 180 to the initiator 300.

Figure 7:
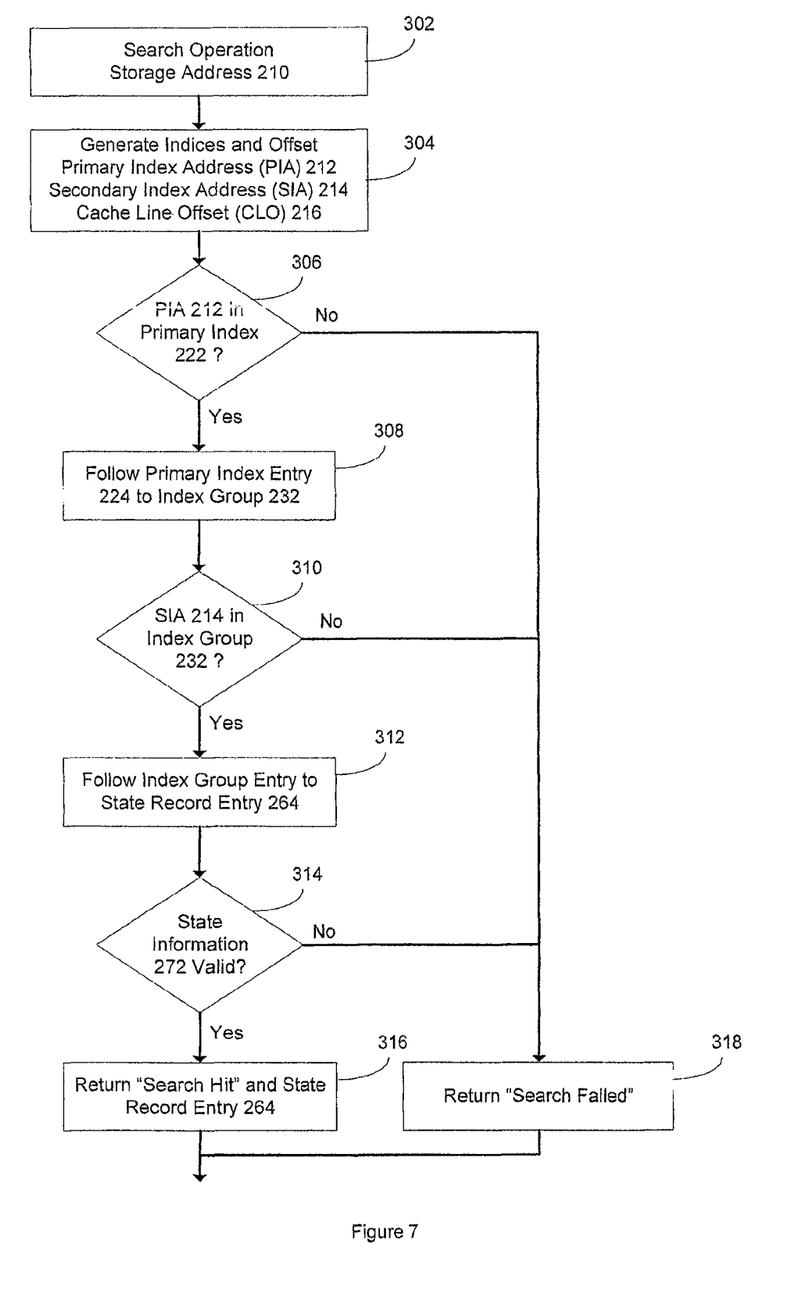
FIG. 7 is a flow diagram showing how the search structure in FIG. 5 conducts a search operation.

FIG. 7 shows in more detail how the mapping engine 200 performs a search operation. In operation 302 the mapping engine 200 receives a search operation request for a particular storage address 210. The search operation 302 may be initiated by the proxy engine 140 based on any variety of reasons. For example, the proxy engine 140 could initiate the search operation 302 based on a read or write request by one of the initiators 300 in FIG. 1.

In operation 304 the mapping engine 200 dissects the storage address 210 into the primary index address 212, secondary index address 214, and cache line offset 216. In operation 306, the mapping engine 200 determines if the primary index address 212 points to a valid primary index entry 224 in primary index table 222. If not, the mapping engine 200 returns a "search failed" message alternatively referenced to as a "miss" to the proxy engine 140 in operation 318.

If valid, the mapping engine in operation 308 uses the valid primary index entry 224 in operation 308 to identify an index group 232 in secondary index table 230. The secondary index address 214 of the storage address 210 is then used to identify a particular pointer 233 in the identified index group 232. If the referenced pointer 233 is invalid in operation 310, the mapping engine 200 returns a miss to the proxy engine in operation 318.

If the pointer 233 is valid in operation 310, the mapping engine 200 uses the pointer 233 to identify a state record entry 264 in the state records table 260. If the state information 272 for the identified state record entry 264 indicates the cache line is invalid in operation 314, the mapping engine 200 returns a miss to the proxy engine 140 in operation 318. If the state information 272 for the identified state record entry 264 indicates the cache line is valid in operation 314, the mapping engine 200 returns a hit and the state record entry 264 to the proxy engine 140 in operation 316. The proxy engine 140 may then use the cache pointer 276 in state record entry 264 for accessing the cached data in cache resource 180.

Add Operation

Figure 8:
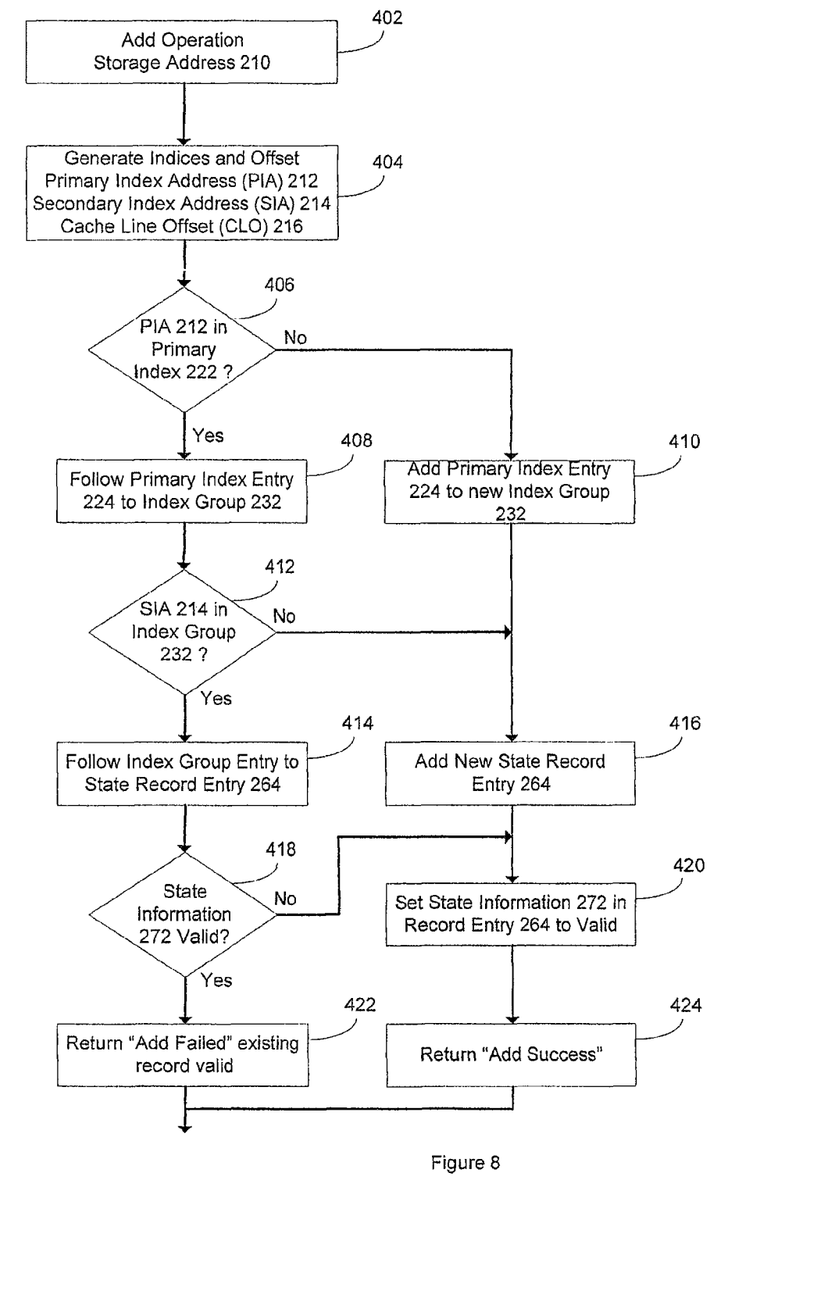
FIG. 8 is a flow diagram showing how the search structure in FIG. 5 conducts an add operation.

FIG. 8 shows how the mapping engine 200 performs an operation to add a new cache line. In operation 402 the mapping engine 200 receives an add request from the proxy engine 140 for a particular storage address 210. For example, the proxy engine 200 may initiate the add operation after a write operation to targets 400 so that the same data is cached in the cache resource 180. The add operation 402 could also be requested by the proxy engine 140 after a read from targets 400 to store the read data into cache resource 180.

In operation 404 the mapping engine 200 again separates the storage address 210 into the primary index address 212, secondary index address 214, and cache line offset 216. The mapping engine 200 uses the primary index address 212 to identify a primary index entry 224 in primary index table 222.

In operation 406, the mapping engine 200 determines if the primary index address 212 references a valid primary index entry 224 in primary index table 222. If not, the mapping engine 200 in operation 410 adds a new primary index entry 224 to the primary index table 222 that points to new index group 232 in the secondary index table 230.

In operation 416 the mapping engine 200 adds a new state record entry 264 to the state records table 260. The address location of the new state record entry 264 in state records 260 is referenced by the pointer 233 in the new index group 232. The mapping engine 200 then sets the state information 272 in the new state record entry 264 to valid in operation 420 and returns an "add success" message to the proxy engine 140 in operation 424.

A valid primary index entry 224 may already exist at the primary index address 212 in operation 406. The mapping engine 200 in operation 408 identifies the index group 232 referenced by the valid index entry 224. The mapping engine 200 in operation 412 then determines if the pointer 233 referenced by the secondary index address 214 is valid.

If the referenced pointer 233 is not valid, the mapping engine 200 in operation 416 adds a new state record entry 264 to the state records table 260 and adds a new pointer 233 to the index group 232 that points to the new state record entry 264. The state information 272 for the new state record entry 264 is set to valid in operation 420 and the mapping engine returns an "add success" message to the proxy engine 140 in operation 424.

If the primary index entry 224 is valid in operation 406 and the pointer 233 in referenced index group 232 is valid in operation 412, the mapping engine 200 in operation 418 determines if the state information 272 in the currently referenced state record entry 264 is valid. If not, the state information 272 in the referenced state record entry 264 is set to valid in operation 420 and the "add success" message is sent to the proxy engine 140 in operation 424.

The primary index entry 224 may be valid in operation 406, the pointer 233 in referenced index group 232 maybe valid in operation 412, and the state information in the currently referenced state record entry 264 may also be valid in operation 418. This indicates a failure condition, since the proxy engine 140 is trying to add a cache line to a location in cache resource 180 that already contains valid data. Accordingly, the mapping engine 200 in operation 422 sends an "add failed" message back to the proxy engine 140.

Delete Operation

Figure 9:
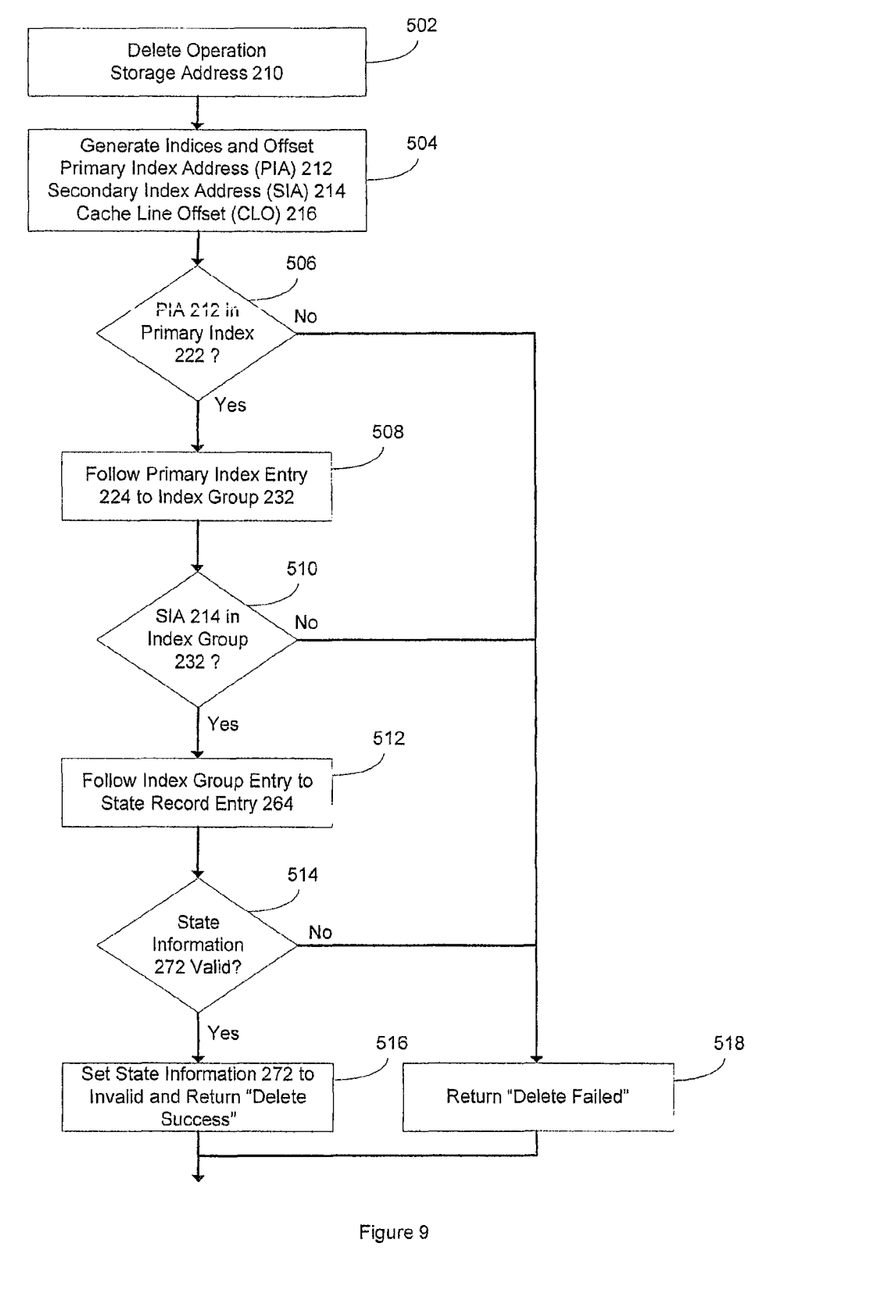
FIG. 9 is a flow diagram showing how the search structure in FIG. 5 conducts a delete operation.

Referring to FIG. 9, the mapping engine 200 receives a delete request for an associated storage address 210 from the proxy engine 140 in operation 502. The mapping engine 200 separates the storage address 210 into the primary index address 212, secondary index address 214, and cache line offset 216 in operation 504.

The mapping engine 200 in operation 506 uses the primary index address 212 from the storage address 210 to identify a primary index entry 224 in primary index table 222. The proxy engine 140 presumably expected the data associated with the delete request to exist in cache resource 180. Accordingly, mapping engine 200 sends the delete fail message in operation 518 when there is no valid primary index entry 224 in operation 506.

If a valid primary index entry 224 exists, the mapping engine 200 identifies the corresponding index group 232 in operation 508. If the pointer entry 233 in the index group 232 is invalid in operation 510, the mapping engine 200 sends the delete failed message to the proxy engine 140 in operation 518.

If the pointer entry 233 is valid in operation 510, the mapping engine 200 references the associated state record entry 264 in operation 512. If the state information 272 in the state record entry 264 is invalid, the mapping engine 200 sends the delete failed message to the proxy engine 140 in operation 518. If the state information 272 in the state record entry 264 is valid, the mapping engine 200 invalidates the state record entry by setting the state information 272 to invalid in operation 516 and returns a "delete success" message to the proxy engine 140.

Learn Operation

Figure 10:
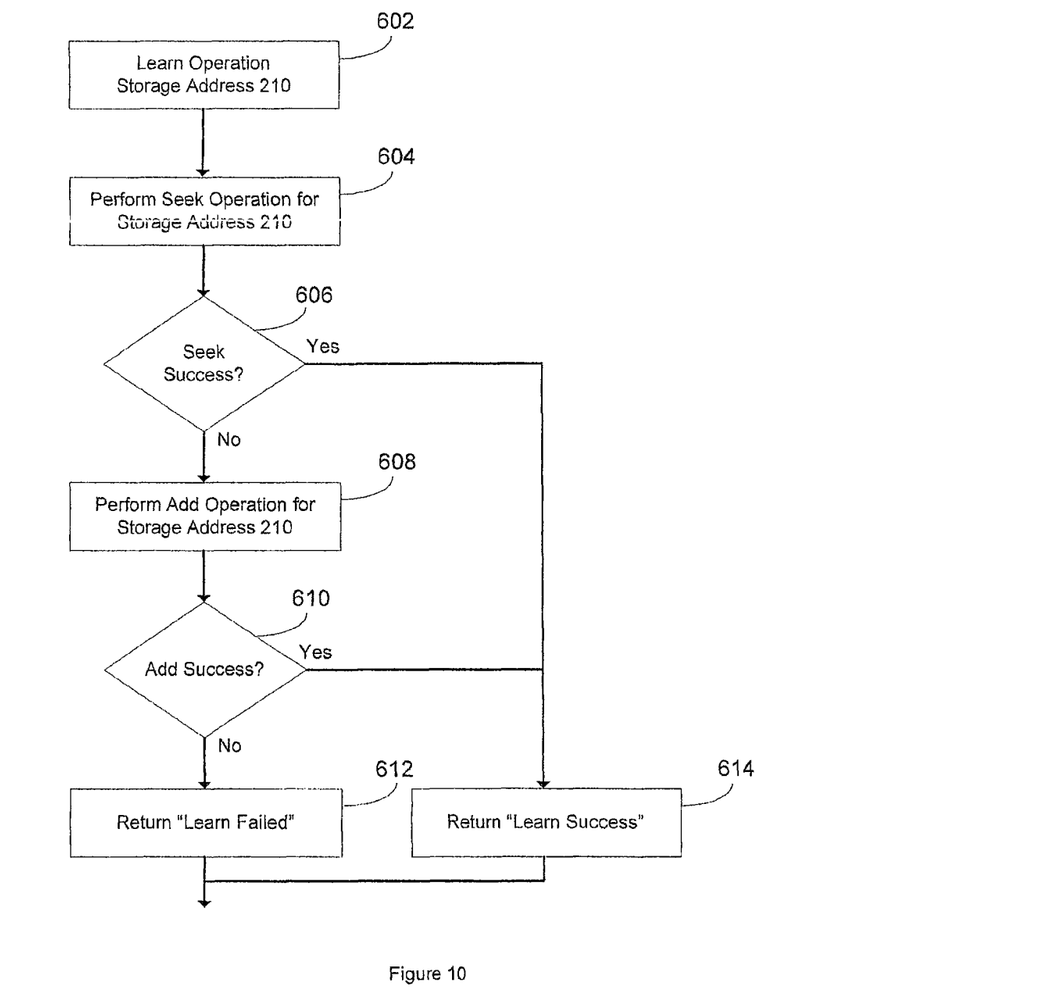
FIG. 10 is a flow diagram showing how the search structure in FIG. 5 conducts a learn operation.

Referring to FIG. 10, the mapping engine 200 may receive a learn request for a particular storage address 210 from the proxy engine 140 in operation 602. The learn operation adds a data item to the cache resource 180 when an immediately preceding seek operation misses. The learn operation 602 allows the mapping engine 200 to perform the seek operation and then possibly conduct the subsequent add operation without another memory operation changing the associated cache line.

The mapping engine 200 in operation 604 determines the valid or invalid status of the cache line associated with the storage address 210 in the same manner described above in FIGS. 7-9. Specifically, the mapping engine identifies the primary index address 212, secondary index address 214, and cache line offset 216 in the storage address 210. The mapping engine 200 in operation 606 determines if the associated primary index entry 224, index group entry 233, and state record entry 264 are all valid. If so, the mapping engine 200 in operation 614 returns a "learn success" message to the proxy engine 140 in operation 614. This indicates the particular storage address 210 has a valid cache line in cache resource 180 and therefore a subsequent add operation to the cache line is not performed.

If the seek is not successful in operation 606, the mapping engine 200 performs an add operation 608 for the storage address 210. The add operation is similar to what was described above in FIG. 8. If the add operation is successful in operation 610, the mapping engine 200 sends the "learn success" message to the proxy engine 140 in operation 614. If the add operation is not successful in operation 610, the mapping engine 200 sends a "learn failed" message to the proxy engine 140 in operation 612.

Search Structure Maintenance

Figure 11:
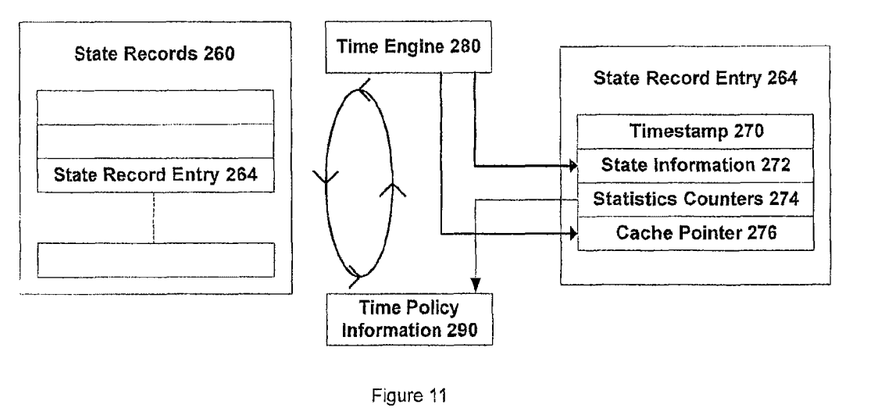
FIGS. 11 and 12 are diagrams showing how the search structure in FIG. 5 conducts a maintenance operation.

Referring to FIG. 11, to recover cache resources, cache lines that have not been accessed for a long period of time are discarded in favor of other cache lines. Time engine 280 periodically examines the timestamp 270 in every state record entry 264 to determine the age of the cache lines. If the cache line associated with state record entry 264 is beyond a certain age threshold specified by a time policy configuration 290, the cache line and corresponding state record entry 264 may be recovered by invalidating the state information 272. The age threshold specified may, in one embodiment, be a function of the current resource utilization.

The time engine 280 may consider other statistics when determining whether or not to allow cache line recovery. For example, a particular cache line may not have been read for the threshold period of time. However, the cache line may have been frequently read just prior to the threshold time period. It may be better to recover a different cache line, since this particular cache line is accessed more frequently. In another example, the statistics counters 274 may determine the average repeat access time for a particular cache line. The time engine 280 may delay recovery of the cache line until the repeat access time has passed.

Figure 12:
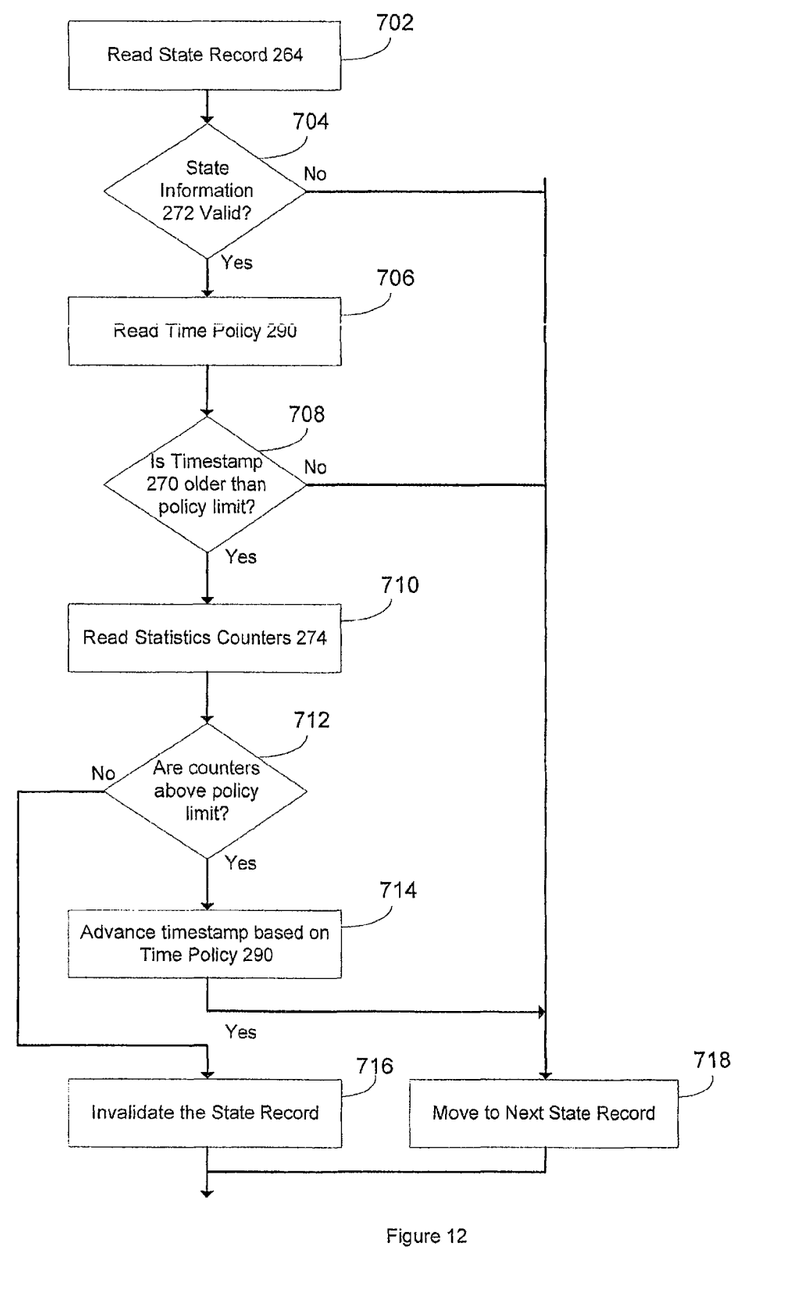

Referring to FIG. 12, the mapping engine reads a state record 264 in operation 702. If the state information 272 is invalid in operation 704, there is no need to invalidate the state record 264. The mapping engine 200 then moves to the next state record in operation 718.

If the state information 272 is valid in operation 704, the mapping engine 200 reads the time policy information 290 in operation 706. If the time stamp 270 is not older than the policy limit in operation 708, the mapping engine 200 moves to the next state record in operation 718. If the timestamp 270 is older than the threshold identified in time policy information 290, the mapping engine 200 reads the statistics counters 274 for the state record 264 in operation 710. If the statistics counters 274 are not above some limit defined in policy information 290, the state record 264 is invalidated in operation 716. This represents a situation where the usage pattern for the cache line does not override the time threshold value.

If the statistics counters 274 in the state record 264 are above some usage policy limit in operation 712, the data in the associated cache line has a particular usage pattern that overrides the timestamp expiration policy in operation 708. Accordingly, the mapping engine 200 in operation 714 advances or resets the timestamp 270 based on the particular usage policy contained in policy information 290. For example, if the statistics counters 274 indicate the data in the cache line is likely to be read again in 30 minutes, the time stamp 270 may be reset to expire after 60 minutes. Otherwise, the time stamp 270 can simply be reset to zero making the data appear as though it was just recently accessed. The mapping engine 200 in operation 718 then moves to the next state record 264 for performing the same maintenance operation.

Thus, a hardware search structure 220 quickly determines the status of cache lines associated with a large disk array and at the same time reduces the amount of memory space needed to search and map cache line status. The search structure 220 is configurable in hardware to different cache line sizes and different primary and secondary index sizes. A maintenance feature invalidates state record entries based both on their timestamps and on associated usage statistics.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. Any modifications and variation coming within the spirit and scope of the present invention are also claimed.

What is claimed is:

1. A apparatus disposable between a user device and a storage array, comprising:
   a processor having:
      a proxy engine configured to receive a message from the user device and interpret the message in accordance with a message protocol to perform storage operations associated with a storage address in the storage array;
      a mapping engine configured to map the storage address to a state record within a state records table, the state record corresponding to a cache line stored in a cache resource;
      a search data structure for locating the state record corresponding to the stored cache line,
      wherein the cache resource is managed in accordance with a policy.

2. The apparatus according to claim 1, wherein the search data structure includes a primary index table addressed by a first portion of the storage address and a secondary index table addressed by the second portion of the storage address.

3. The apparatus according to claim 2, wherein the state records table is addressed by an address offset of a third portion of the storage address.

4. The apparatus of claim 3, wherein the size of the first portion, the size of the second portion and the size of the third portion is adjustable.

5. The apparatus according to claim 2, wherein the primary index table includes primary index entries that contain at least one of an address or an address offset to a group of entries in the secondary index table and the secondary index table is configured to store pointers that contain at least one of an address or an address offset of a state record in the state records table.

6. The apparatus according to claim 1, wherein the cache resource is a solid state memory.

7. The apparatus according to claim 6, wherein the solid state memory is a solid state disk.

8. The apparatus of claim 1, wherein the storage array is a memory system in communication with the apparatus.

9. The apparatus of claim 8, wherein the storage array is a disk memory system.

10. The apparatus of claim 1, wherein the cache line size is dynamically adjustable.

11. The apparatus according to claim 1, wherein the search data structure is configured to manage cache resources by executing a policy based on a plurality of measures of cache line activity.

12. The apparatus according to claim 11, wherein the management of the cache resources includes the step of one of invalidating the cache line or updating a time interval counter for the cache line in the state table.

13. The apparatus according to claim 11, wherein at least one of the measures is a statistical measure.

14. The apparatus processor according to claim 1, wherein the processor is configured to update the search data structure responsive to the completion of a storage operation initiated by the processor.

15. A method, comprising:
   configuring a processor to perform the steps of:
   receiving a message having a storage operation request having a storage address;
   addressing a primary index table with a primary index address of the storage address;
   using a primary index entry addressed in the primary index table to address an index group in a secondary index table;
   identifying a pointer in the addressed index group with a secondary index address of the storage address;
   using the identified pointer to address a state record entry in a state record table; and
   updating the state record table.

16. The method according to claim 15, further comprising invalidating the state record entry according to both a time stamp value in the state record entry and cache line access statistics in the state record entry.

17. The method according to claim 15, further comprising storing a cache line corresponding to the storage address in a cache resource.

18. The method according to claim 15, further comprising dynamically determining a cache line size based on an average number of blocks of data accessed by the received storage address.

19. The method of claim 16, further comprising adjusting the cache line access statistics in accordance with a policy.

* * * * *